(12) United States Patent
Roesch et al.

(10) Patent No.: US 7,701,945 B2
(45) Date of Patent: Apr. 20, 2010

(54) DEVICE, SYSTEM AND METHOD FOR ANALYSIS OF SEGMENTS IN A TRANSMISSION CONTROL PROTOCOL (TCP) SESSION

(75) Inventors: Martin Frederick Roesch, Eldersburg, MD (US); Judy Hollis Novak, Marriottsville, MD (US); Steven Sturges, Ellicott City, MD (US)

(73) Assignee: Sourcefire, Inc., Columbia, MD (US)

( * ) Notice: Subject to any disclaimer, the term of this patent is extended or adjusted under 35 U.S.C. 154(b) by 712 days.

(21) Appl. No.: 11/501,776

(22) Filed: Aug. 10, 2006

(65) Prior Publication Data

US 2008/0037587 A1 Feb. 14, 2008

(51) Int. Cl.
*H04L 12/28* (2006.01)

(52) U.S. Cl. .............................. 370/394; 726/1; 726/23; 370/412

(58) Field of Classification Search .................. 370/389, 370/446, 474; 726/1, 23
See application file for complete search history.

(56) References Cited

U.S. PATENT DOCUMENTS

| | | | |
|---|---|---|---|
| 4,550,436 A | 10/1985 | Freeman | |
| 4,570,157 A | 2/1986 | Kodaira | |
| 4,857,912 A | 8/1989 | Everett et al. | |
| 4,912,748 A | 3/1990 | Horii et al. | |
| 4,985,863 A | 1/1991 | Fujisawa et al. | |
| 5,193,192 A | 3/1993 | Seberger | |
| 5,222,081 A | 6/1993 | Lewis et al. | |
| 5,430,842 A | 7/1995 | Thompson et al. | |
| 5,459,841 A | 10/1995 | Flora-Holmquist et al. | |
| 5,604,910 A | 2/1997 | Kojima et al. | |
| 5,796,942 A | 8/1998 | Esbensen | |
| 5,870,554 A | 2/1999 | Grossman et al. | |
| 5,901,307 A | 5/1999 | Potter et al. | 712/240 |
| 5,917,821 A | 6/1999 | Gobuyan et al. | |
| 5,919,257 A | 7/1999 | Trostle | |
| 5,963,942 A | 10/1999 | Igata | |
| 5,987,473 A | 11/1999 | Jorgensen | |
| 5,995,963 A | 11/1999 | Nanba et al. | |
| 5,999,937 A | 12/1999 | Ellard | |
| 6,002,427 A | 12/1999 | Kipust | |
| 6,141,686 A | 10/2000 | Jackowski et al. | |
| 6,199,181 B1 | 3/2001 | Rechef et al. | |
| 6,219,786 B1 | 4/2001 | Cunningham et al. | |
| 6,320,848 B1 | 11/2001 | Edwards et al. | |
| 6,321,338 B1 | 11/2001 | Porras et al. | |
| 6,324,656 B1 | 11/2001 | Gleichauf et al. | |

(Continued)

OTHER PUBLICATIONS

Office Action issued by the U.S. Patent Office on Oct. 6, 2008 in connection with related U.S. Appl. No. 10/843,374.

(Continued)

*Primary Examiner*—Derrick W Ferris
*Assistant Examiner*—Christopher R Crompton
(74) *Attorney, Agent, or Firm*—Posz Law Group, PLC

(57) ABSTRACT

A method performed in an intrusion detection/prevention system, a system or a device for analyzing segments in a transmission in a communication network. The transmission includes segments in the same transmission control protocol (TCP) session. Segments in a transmission are monitored. Data in the segments in the transmission are reassembled in an order indicated by a segment reassembly policy, the segment reassembly policy indicating an order specific to at least comprehensively overlapped segments.

24 Claims, 8 Drawing Sheets

U.S. PATENT DOCUMENTS

| | | | |
|---|---|---|---|
| 6,334,121 | B1 | 12/2001 | Primeaux et al. |
| 6,343,362 | B1 | 1/2002 | Ptacek et al. |
| 6,393,474 | B1 | 5/2002 | Eichert et al. |
| 6,415,321 | B1 | 7/2002 | Gleichauf et al. |
| 6,477,648 | B1 | 11/2002 | Schell et al. |
| 6,487,666 | B1 | 11/2002 | Shanklin et al. |
| 6,499,107 | B1 | 12/2002 | Gleichauf et al. |
| 6,539,381 | B1 | 3/2003 | Prasad et al. |
| 6,587,876 | B1 | 7/2003 | Mahon et al. |
| 6,590,885 | B1 | 7/2003 | Jorgensen |
| 6,678,734 | B1 | 1/2004 | Haatainen et al. |
| 6,678,824 | B1 | 1/2004 | Cannon et al. |
| 6,711,127 | B1 | 3/2004 | Gorman et al. |
| 6,754,826 | B1 | 6/2004 | Challenger et al. |
| 6,766,320 | B1 | 7/2004 | Wang et al. |
| 6,772,196 | B1 | 8/2004 | Kirsch et al. |
| 6,789,202 | B1 | 9/2004 | Ko et al. |
| 6,851,061 | B1 | 2/2005 | Holland et al. |
| 6,957,348 | B1 | 10/2005 | Flowers et al. |
| 6,983,323 | B2 | 1/2006 | Cantrell et al. |
| 6,999,998 | B2 | 2/2006 | Russell |
| 7,032,114 | B1 | 4/2006 | Moran .................. 713/187 |
| 7,058,821 | B1 | 6/2006 | Parekh et al. |
| 7,065,657 | B1 | 6/2006 | Moran |
| 7,073,198 | B1 | 7/2006 | Flowers et al. .............. 726/25 |
| 7,076,803 | B2 | 7/2006 | Bruton et al. |
| 7,096,503 | B1 | 8/2006 | Magdych et al. |
| 7,113,789 | B1 | 9/2006 | Boehmke |
| 7,133,916 | B2 | 11/2006 | Schunemann |
| 7,134,141 | B2 | 11/2006 | Crosbie et al. |
| 7,152,105 | B2 | 12/2006 | McClure et al. .............. 709/224 |
| 7,257,630 | B2 | 8/2007 | Cole et al. .................. 709/224 |
| 7,305,708 | B2 | 12/2007 | Norton et al. |
| 7,310,688 | B1 | 12/2007 | Chin ........................ 709/252 |
| 7,313,695 | B2 | 12/2007 | Norton et al. |
| 7,315,801 | B1 | 1/2008 | Dowd et al. |
| 7,317,693 | B1 | 1/2008 | Roesch et al. |
| 7,363,656 | B2 | 4/2008 | Weber et al. |
| 2001/0027485 | A1 | 10/2001 | Ogishi et al. |
| 2001/0034847 | A1 | 10/2001 | Gaul, Jr. |
| 2002/0035639 | A1 | 3/2002 | Xu |
| 2002/0066034 | A1 | 5/2002 | Schlossberg |
| 2002/0083344 | A1 | 6/2002 | Vairavan |
| 2002/0087716 | A1 | 7/2002 | Mustafa |
| 2002/0112185 | A1 | 8/2002 | Hodges |
| 2002/0123995 | A1 | 9/2002 | Shibuya |
| 2002/0165707 | A1 | 11/2002 | Call |
| 2003/0014662 | A1 | 1/2003 | Gupta et al. |
| 2003/0046388 | A1 | 3/2003 | Milliken |
| 2003/0065817 | A1 | 4/2003 | Benchetrit et al. |
| 2003/0083847 | A1 | 5/2003 | Schertz et al. |
| 2003/0093517 | A1 | 5/2003 | Tarquini et al. |
| 2003/0101353 | A1 | 5/2003 | Tarquini et al. .............. 713/200 |
| 2003/0140250 | A1 | 7/2003 | Taninaka et al. |
| 2003/0195874 | A1 | 10/2003 | Akaboshi |
| 2003/0229726 | A1 | 12/2003 | Daseke et al. |
| 2004/0015728 | A1 | 1/2004 | Cole et al. |
| 2004/0034773 | A1 | 2/2004 | Balabine et al. |
| 2004/0064726 | A1 | 4/2004 | Girouard |
| 2004/0073800 | A1 | 4/2004 | Shah et al. |
| 2004/0093582 | A1 | 5/2004 | Segura |
| 2004/0098618 | A1 | 5/2004 | Kim et al. |
| 2004/0123153 | A1 | 6/2004 | Wright et al. |
| 2004/0172234 | A1 | 9/2004 | Dapp et al. |
| 2004/0179477 | A1 | 9/2004 | Lincoln et al. |
| 2004/0193943 | A1 | 9/2004 | Angelino et al. |
| 2004/0268358 | A1 | 12/2004 | Darling et al. |
| 2005/0005169 | A1 | 1/2005 | Kelekar |
| 2005/0044422 | A1* | 2/2005 | Cantrell et al. .............. 713/201 |
| 2005/0108393 | A1 | 5/2005 | Banerjee et al. |
| 2005/0113941 | A1 | 5/2005 | Ii et al. |
| 2005/0114700 | A1 | 5/2005 | Barrie et al. |
| 2005/0160095 | A1 | 7/2005 | Dick et al. |
| 2005/0172019 | A1 | 8/2005 | Williamson et al. |
| 2005/0188079 | A1 | 8/2005 | Motsinger et al. |
| 2005/0240604 | A1 | 10/2005 | Corl, Jr. et al. |
| 2005/0268331 | A1 | 12/2005 | Le et al. |
| 2005/0268332 | A1 | 12/2005 | Le et al. |
| 2005/0273857 | A1 | 12/2005 | Freund |
| 2006/0174337 | A1 | 8/2006 | Bernoth |
| 2006/0265748 | A1 | 11/2006 | Potok |
| 2006/0294588 | A1 | 12/2006 | Lahann et al. |
| 2007/0192863 | A1* | 8/2007 | Kapoor et al. .............. 726/23 |
| 2007/0288579 | A1 | 12/2007 | Schunemann |
| 2008/0168561 | A1 | 7/2008 | Durie et al. |
| 2009/0028147 | A1* | 1/2009 | Russell .................. 370/389 |

OTHER PUBLICATIONS

Notice of Allowance issued by the U.S. Patent Office on Oct. 15, 2008 in connection with related U.S. Appl. No. 10/951,796.

Notice of Allowance issued by the U.S. Patent Office on Oct. 21, 2008 in connection with related U.S. Appl. No. 10/843,375.

European Office Action issued by the European Patent Office on Nov. 28, 2008 in connection with corresponding European patent application No. 07 015 003.2-2413.

Office Action issued by the U.S. Patent Office on Dec. 17, 2008 in connection with related U.S. Appl. No. 10/843,398.

Office Action issued by the U.S. Patent Office on Dec. 23, 2008 in connection with related U.S. Appl. No. 11/272,034.

Novak, J., *Target-Based Fragmentation Reassesmbly*, Internet Citation, Apr. 2005.

The Snort Project, *Snort TM Users Manual*, May 23, 2006.

Novak, J. et al., *Target-Based TCP Stream Reassesmbly*, Internet Citation, Aug. 3, 2007.

European Search Report dated Dec. 27, 2007 in corresponding European Patent Application No. 07015003.2413.

Office Action issued on Feb. 5, 2008 in connection with the related U.S. Appl. No. 10/843,375.

Spitzner, Lance; Passive Fingerprinting, May 3, 2003; FOCUS on Intrusion Detection; pp. 1-4; obtained from http://www.ctillhq.com/pdfdb/000183/data.pdf.

Lyon, Gordon; Remote OS detection via TCP/IP Stack Fingerprinting, Jun. 30, 2002; pp. 1-12; obtained from: http://web.archive.org/web/20021017063625/www.insecure.org/nmap/nmap-fingerprinting-article.html.

Office Action issued by the U.S. Patent Office on Jan. 16, 2009 in connection with related U.S. Appl. No. 10/843,353.

Office Action issued by the U.S. Patent Office on Jan. 21, 2009 in connection with related U.S. Appl. No. 11/493,934.

Notice of Allowance issued by the U.S. Patent Office on Jan. 21, 2009 in connection with related U.S. Appl. No. 10/898,220.

Office Action issued by the U.S. Patent Office on Feb. 4, 2009 in connection with related U.S. Appl. No. 10/843,373.

Office Action issued by the U.S. Patent Office on Feb. 9, 2009 in connection with related U.S. Appl. No. 10/843,459.

International Preliminary Report on Patentability and Written Opinion of the International Searching Authority mailed on Mar. 3, 2009 in connection with PCT application No. PCT/US05/025584, which corresponds to related U.S. Appl. No. 10/898,220.

International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.

U. Shankar and V. Paxson, *Active Mapping: Resisting NIDS Evasion Without Altering Traffic*, Proc. IEEE Symposium on Security and Privacy. May 2003, pp. 1-18.

Thomas H Ptacek et al., *Insertion, Evasion, and Denial of Service: Eluding Network Intrusion Detection*, Jan. 1998, pp. 1-63.

U.S. Appl. No. 10/843,353, filed May 2004, Roesch et al., System and Method for Determining Characteristics of a Network and Analyzing Vulnerabilities.

U.S. Appl. No. 10/843,373, filed May 2004, Roesch et al., Systems and Methods for Identifying the Services of a Network.

U.S. Appl. No. 10/843,374, filed May 2004, Roesch et al., System and Methods for Determining Characteristics of a Network Based on Flow Analysis.

U.S. Appl. No. 10/843,375, filed May 2004, Roesch et al., Systems and Methods for Determining Characteristics of a Network and Assessing Confidence.

U.S. Appl. No. 10/843,398, filed May 2004, Roesch et al., Systems and Methods for Determining Characteristics of a Network.

U.S. Appl. No. 10/843,459, filed May 2004, Roesch et al., Systems and Methods for Determining Characteristics of a Network and Enforcing Policy.

U.S. Appl. No. 10/898,220, filed Jul. 2004, Norton et al., Methods and Systems for Multi-Pattern Searching.

U.S. Appl. No. 10/951,796, filed Sep. 2004, Roelker et al., Intrusion Detection Strategies for Hypertext Transport Protocol.

U.S. Appl. No. 11/272,033, filed Nov. 2005, Dempster et al., Systems and Methods for Identifying the Client Applications of a Network.

U.S. Appl. No. 11/272,034, filed Nov. 2005, Vogel III et al., Systems and Methods for Modifying Network Map Attributes.

U.S. Appl. No. 11/272,035, filed Nov. 2005, Gustafson et al., Intrusion Event Correlation with Network Discovery Information.

U.S. Appl. No. 11/493,934, filed Jul. 2006, Roesch et al., Device, System and Method for Analysis of Fragments in a Fragment Train.

U.S. Appl. No. 11/711,876, filed Feb. 2007, Sturges et al., Device, System and Method for Timestamp Analysis of Segments in a Transmission Control Protocol (TCP) Session.

U.S. Appl. No. 11/785,609, filed Apr. 2007, Norton et al., Methods and Systems for Multi-Pattern Searching.

U.S. Appl. No. 11/905,980, filed Oct. 2007, Roesch, Device, System and Method for Use of Micro-Policies in Intrusion Detection/Prevention.

U.S. Appl. No. 12/010,900, filed Jan. 2008, Norton et al., Methods and Systems for Multi-Pattern Searching.

U.S. Appl. No. 12/149,196, filed Apr. 2008, Rittermann, Real-Time User Awareness for a Computer Network.

U.S. Appl. No. 12/230,338, filed Aug. 2008, Sturges et al., Speed and Memory Optimization of Intrusion Detection System (IDS) and Intrusion Prevention System (IPS) Rule Processing.

Aho et al., "Efficient String Matching: An Aid to Bibliographic Search," *Communications from the ACM* (Jun. 1975), vol. 18, No. 6, pp. 333-340.

Tarjan, et al., "Storing a Sparse Table," Communications of the ACM (Nov. 1979), vol. 2, No. 11, pp. 606-620.

N. Chase, "Active Server Pages 3.0 from Scratch" (Dec. 1999), Searching for products section, 13 pp.

B. Krishnamurthy, "Web Protocols and Practice," (May 1, 2001), pp. 518-520.

D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.

Norton et al., "Multi-Patten Search Engine Aho-Corasick State Machine" (Mar. 17, 2004), Version 2.0, 36 pp.

M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.

Norton et al., "Sourcefire Optimizing Pattern Matching for Intrusion Detection" (Sep. 2004), 14 pp.

S.Siddharth, "Evading NIDS, revisited" (Dec. 12, 2005).

"Toupper( )—convert lowercase character to uppercase," http://www.mkssoftware.com, printed on Sep. 20, 2008 from http://web.archive.org, archive date Jun. 30, 2006, 2 pp.

"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.

Office Action issued by the U.S. Patent Office on Jul. 16, 2007 in connection with related U.S. Appl. No. 10/898,220.

Office Action issued by the U.S. Patent Office on Sep. 6, 2007 in connection with related U.S. Appl. No. 10/843,374.

Notice of Allowance issued by the U.S. Patent Office on Sep. 6, 2007 in connection with related U.S. Appl. No. 10/843,376.

Office Action issued by the U.S. Patent Office on Sep. 26, 2007 in connection with related U.S. Appl. No. 10/843,353.

Office Action issued by the U.S. Patent Office on Oct. 4, 2007 in connection with related U.S. Appl. No. 10/951,796.

Notice of Allowance issued by the U.S. Patent Office on Oct. 5, 2007 in connection with related U.S. Appl. No. 10/793,887.

International Search Report and Written Opinion of the International Searching Authority issued on Oct. 9, 2007 in connection with PCT application No. PCT/US06/43800, which corresponds to U.S. Appl. No. 11/272,034.

Office Action issued by the U.S. Patent Office on Nov. 21, 2007 in connection with related U.S. Appl. No. 10/843,398.

European Search Report issued by the European Patent Office on Nov. 22, 2007 in connection with European patent application No. 07014575.0-1244, which corresponds to related U.S. Appl. No. 11/493,934.

International Search Report and Written Opinion of the International Searching Authority issued on Dec. 5, 2007 in connection with PCT application No. PCT/US05/25583, which corresponds to U.S. Appl. No. 10/951,796.

Office Action issued by the U.S. Patent Office on Jan. 10, 2008 in connection with related U.S. Appl. No. 10/843,373.

Office Action issued by the U.S. Patent Office on Feb. 21, 2008 in connection with related U.S. Appl. No. 11/272,033.

Office Action issued by the U.S. Patent Office on Mar. 12, 2008 in connection with related U.S. Appl. No. 10/843,459.

Office Action issued by the U.S. Patent Office on Mar. 20, 2008 in connection with related U.S. Appl. No. 10/843,374.

Final Office Action issued by the U.S. Patent Office on May 9, 2008 in connection with related U.S. Appl. No. 10/843,353.

International Preliminary Report on Patentability mailed on May 22, 2008 in connection with PCT application No. PCT/US06/43800, which corresponds to U.S. Appl. No. 11/272,034.

Final Office Action issued by the U.S. Patent Office on Jun. 4, 2008 in connection with related U.S. Appl. No. 10/843,398.

International Search Report and Written Opinion of the International Searching Authority issued on Jun. 19, 2008 in connection with PCT application No. PCT/US05/25584, which corresponds to U.S. Appl. No. 10/898,220.

Final Office Action issued by the U.S. Patent Office on Jun. 26, 2008 in connection with related U.S. Appl. No. 10/898,220.

International Search Report and Written Opinion of the International Searching Authority issued on Jun. 30, 2008 in connection with PCT application No. PCT/US07/21351, which corresponds to U.S. Appl. No. 11/905,980.

International Search Report and Written Opinion of the International Searching Authority issued on Jul. 2, 2008 in connection with PCT application No. PCT/US08/02454, which corresponds to U.S. Appl. No. 11/711,876.

International Search Report and Written Opinion of the International Searching Authority issued on Jul. 7, 2008 in connection with PCT application No. PCT/US06/43820, which corresponds to U.S. Appl. No. 11/272,035.

Office Action issued by the U.S. Patent Office on Jul. 11, 2008 in connection with related U.S. Appl. No. 11/272,034.

Final Office Action issued by the U.S. Patent Office on Jul. 17, 2008 in connection with related U.S. Appl. No. 10/843,459.

Final Office Action issued by the U.S. Patent Office on Aug. 6, 2008 in connection with related U.S. Appl. No. 10/843,375.

Notice of Allowance issued by the U.S. Patent Office on Aug. 18, 2008 in connection with related U.S. Appl. No. 11/272,033.

International Search Report and Written Opinion of the International Searching Authority issued on Aug. 18, 2008 in connection with PCT application No. PCT/US08/05466, which corresponds to U.S. Appl. No. 12/149,196.

Final Office Action issued by the U.S. Patent Office on Aug. 19, 2008 in connection with related U.S. Appl. No. 10/843,373.

Final Office Action issued by the U.S. Patent Office on Aug. 20, 2008 in connection with related U.S. Appl. No. 10/843,353.

R. Deraison, et al., "Passive Vulnerability Scanning: Introduction to NeVO," *Tenable Network Security*, May 30, 2004, pp. 1-13.

Full Band and Matrix Algorithms (Jun. 9, 2004), http://web.archive.org/web20040109154658/http://www.netlib.org/utk/lsi/pcwLSI/text/node150.html.

R. Deraison, et al., "Nessus Network Auditing," *Sungress Publishing*, Jul. 20, 2004, pp. 1-13.

International Preliminary Report on Patentability mailed on Apr. 7, 2009 in connection with PCT application No. PCT/US07/021351, which corresponds to U.S. Appl. No. 11/905,980.

Final Office Action issued by the U.S. Patent Office on May 13, 2009 in connection with related U.S. Appl. No. 10/843,374.

Office Action issued by the U.S. Patent Office on May 14, 2009 in connection with related U.S. Appl. No. 11/272,034.

International Search Report and Written Opinion of the International Searching Authority mailed on May 27, 2009 in connection with PCT application No. PCT/US09/02210, which corresponds to U.S. Appl. No. 12/230,338.

Office Action issued by the U.S. Patent Office on Jun. 1, 2009 in connection with related U.S. Appl. No. 11/272,035.

Notice of Allowance issued by the U.S. Patent Office on Jun. 11, 2009 in connection with related U.S. Appl. No. 10/843,373.

Office Action issued by the U.S. Patent Office on Jun. 23, 2009 in connection with related U.S. Appl. No. 11/785,609.

Office Action issued by the U.S. Patent Office on Jul. 6, 2009 in connection with related U.S. Appl. No. 10/843,459.

Office Action issued by the U.S. Patent Office on Jul. 7, 2009 in connection with related U.S. Appl. No. 10/843,398.

Office Action issued by the U.S. Patent Office on Jul. 28, 2009 in connection with related U.S. Appl. No. 10/843,353.

Office Action issued by the U.S. Patent Office on Jul. 30, 2009 in connection with related U.S. Appl. No. 11/493,934.

Office Action issued by the U.S. Patent Office on Aug. 20, 2009 in connection with related U.S. Appl. No. 10/843,374.

International Preliminary Report on Patentability mailed on Sep. 11, 2009 in connection with PCT application No. PCT/US08/002454, which corresponds to U.S. Appl. No. 11/711,876.

Advisory Action issued by the U.S. Patent Office on Sep. 29, 2009 in connection with related U.S. Appl. No. 10/843,459.

European Search Report issued by the European Patent Office on Oct. 12, 2009 in connection with European patent application No. 05773501.1 -2201, which corresponds to related U.S. Appl. Nos. 10/898,220, 11/785,609 and 12/010,900.

International Preliminary Report on Patentability mailed on Nov. 12, 2009 in connection with PCT application No. PCT/US08/005466, which corresponds to U.S. Appl. No. 12/149,196.

Advisory Action issued by the U.S. Patent Office on Dec. 2, 2009 in connection with related U.S. Appl. No. 10/843,398.

Final Office Action issued by the U.S. Patent Office on Dec. 8, 2009 in connection with related U.S. Appl. No. 11/272,034.

Final Office Action issued by the U.S. Patent Office on Dec. 9, 2009 in connection with related U.S. Appl. No. 11/272,035.

Office Action issued by the U.S. Patent Office on Dec. 17, 2009 in connection with related U.S. Appl. No. 11/493,934.

* cited by examiner

DEVICE, SYSTEM AND METHOD FOR ANALYSIS OF SEGMENTS IN A TRANSMISSION CONTROL PROTOCOL (TCP) SESSION

FIELD OF THE INVENTION

The present invention relates in general to network traffic analysis, and more specifically to analyzing segments in a transmission of a transmission control protocol (TCP) session, optionally in connection with intrusion detection/prevention.

BACKGROUND OF THE INVENTION

The transport layer protocol utilized in packet network communications allows a TCP transmission to be separated into variable sized segments which are sent to the destination, as part of the same TCP session. Each segment still belongs to the original TCP transmission, and can be reassembled by the destination to re-create the original TCP transmission.

Different kinds of operating systems have unique methods of TCP segment reassembly. These methods of reassembling TCP segments can be exploited by attackers. In their landmark 1998 paper, "Insertion, Evasion, and Denial of Service: Eluding Network Intrusion Detection," Thomas Ptacek and Timothy Newsham exposed some weaknesses in intrusion detection systems (IDS). The authors revealed that an IDS cannot be effective and accurate because it does not necessarily process or even observe network traffic exactly as the destination host that receives the message does.

If an IDS utilizes a single reassembly method, it may not analyze the same reassembled payload as an operating system at the destination. Consequently, an attack that successfully exploits these differences in TCP segment reassembly can cause the IDS to miss the malicious traffic.

SUMMARY OF THE INVENTION

Accordingly, one or more embodiments of the present invention provide methods, systems, and computer readable mediums for analyzing segments in a transmission in a communication network, the transmission including segments in the same transmission control protocol (TCP) session. The method includes monitoring segments in a transmission; and reassembling data in the segments in the transmission in an order indicated by a segment reassembly policy, the segment reassembly policy indicating an order specific to at least comprehensively overlapped segments.

Other embodiments provide methods, systems, and computer-readable mediums comprising instructions for execution by a computer, for analyzing segments in a transmission in a communication network, a transmission including segments in the same transmission control protocol (TCP) session and associated with the same destination, where segments can be non-overlapped, partially overlapped, and/or completely overlapped. The instructions are for implementation of identifying one or more segment reassembly policies of plural segment reassembly policies, the reassembly policy(ies) corresponding to a destination associated with segments in a transmission; and providing data in the segments in the transmission in an order indicated by the segment reassembly policy(ies), the segment reassembly policy(ies) indicating an order specific to at least comprehensively overlapped segments.

Yet other embodiments provide methods and computer systems for detecting and/or preventing intrusion. A unit is configured to facilitate determining a kind of host associated with a destination, in response to an indication of the destination in segments in a transmission control protocol (TCP) session. A segment reassembly unit is configured to facilitate identifying one or more segment reassembly policy(ies) of plural segment reassembly policies, the segment reassembly policy(ies) corresponding to the kind of host associated with the segments in the transmission. An order providing unit is configured to facilitate providing data in the segments in the transmission in an order indicated by the segment reassembly policy(ies). A further embodiment provides a method performed in an intrusion detection/prevention system, for analyzing segments in a transmission in a communication network, the transmission including segments in the same transmission control protocol (TCP) session. The method includes monitoring the segments in a transmission; and reassembling data in the segments in the transmission in an order indicated by a segment reassembly policy. The segment reassembly policy includes an evaluation of an urgent indication in the segments.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
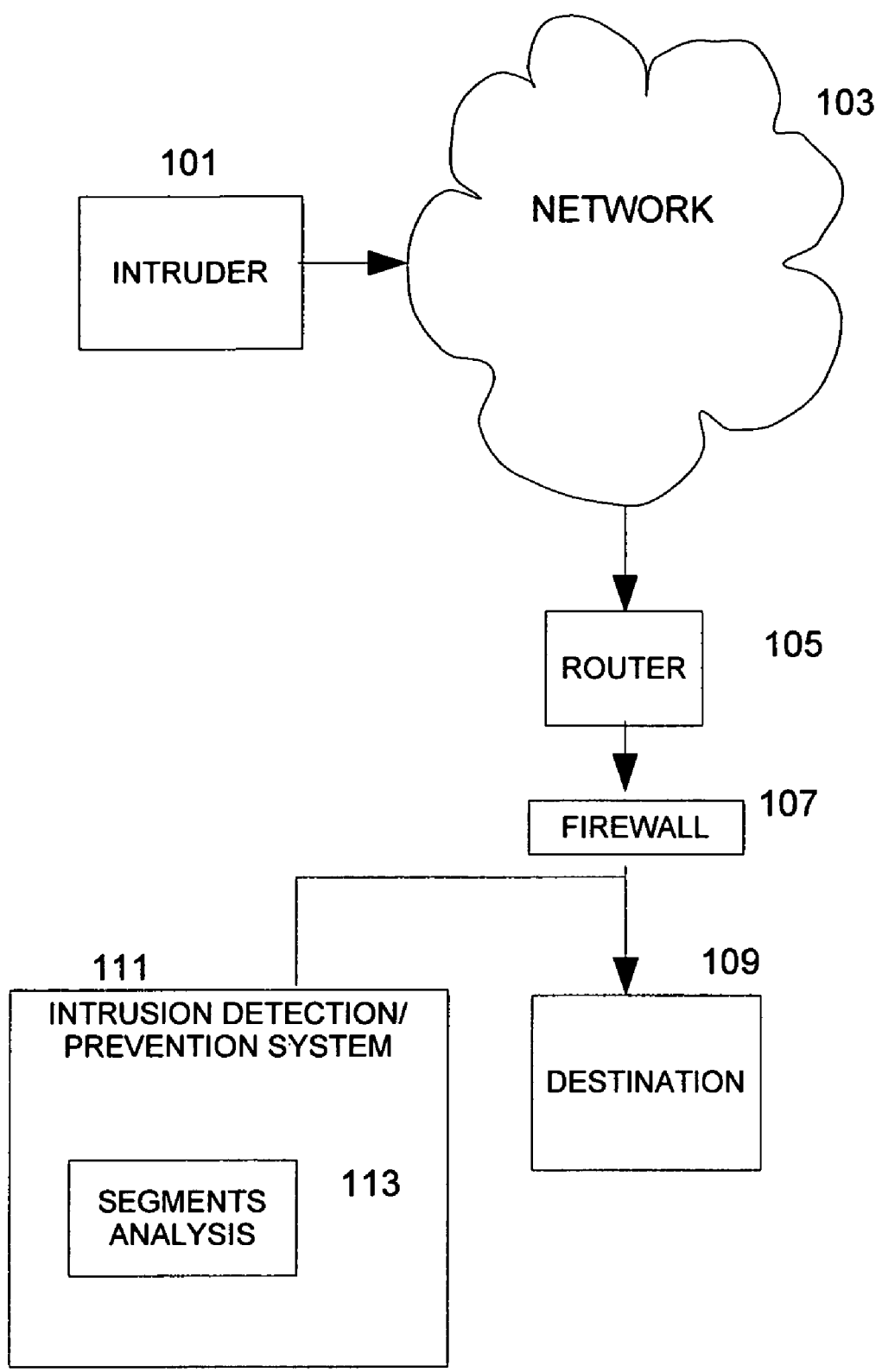
FIG. 1 is a diagram illustrating a simplified and representative environment associated with segment analysis.

In overview, the present disclosure concerns analysis of network traffic on communication networks, often referred to as packet switching networks, which support communication from wireless and/or wire line devices to a destination. Such communication networks may carry variable sized transmission control protocol (TCP) segments. More particularly, various inventive concepts and principles are embodied in systems, devices, and methods therein for analyzing segments, optionally in connection with intrusion detection/prevention systems.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Even though some problems with analyzing network traffic were identified by Ptacek and Newsham, many problems still exist in analyzing TCP segments. As further discussed herein, various inventive principles and combinations thereof are advantageously employed to improve analysis of TCP segments. The analysis of segments can be target-based, that is, the analysis can consider the operating system and applications at the destination, so that traffic sent to the destination can be analyzed in the same manner as the destination itself analyzes the traffic. This can reduce false positives about irrelevant alerts, such as an exploit specific to a WINDOWS operating system bound for a host running a UNIX operating system. Moreover, deliberately mangled overlapping segment transmissions are less likely to dupe the intrusion detection/prevention system.

Further in accordance with exemplary embodiments, the problems posed by overlapping segments can be solved by reassembling overlapping segments in the same manner as the destination system happens to assemble segments. Segment reassembly policies can be provided, corresponding to destination systems and/or the kinds of hosts associated with destinations. Thus, the segment analysis can select the appropriate one of the segment reassembly policies depending on the destination, and can apply the appropriate segment reassembly policy. The segment analysis can handle various types of overlapping segments including comprehensively overlapped segments, thereby reducing evasion attacks that use overlapping segments.

Referring to FIG. 1, a diagram illustrating a simplified and representative environment associated with segment analysis will be discussed and described. In the illustration, an intruder 101 (such as a computer system) transmits transmission to a destination 109. In this example, the transmission is transmitted via a network 103, a router 105, and a firewall 107 to the destination 109. The communications to the destination 109 can be monitored in accordance with well known techniques by an intrusion detection/prevention system 111$m$ such as with a sensor. Although this illustration provides a sensor behind the firewall 107, the sensor can be provided anywhere before the destination 109. Alternatively, the intrusion detection/prevention system 111 can be provided in-line with the destination 109, or can be incorporated into the destination 109.

A transmission can be segmented at the transmission control protocol ("TCP") layer into segments in accordance with known techniques. Moreover, overlapping TCP segments may appear in normal traffic, for example for a retransmission of unacknowledged data. The TCP segments are sent to the destination 109, and the destination 109 reassembles the segments into the transmission. The order in which the destination 109 reassembles segments is a by-product of the segment processing in the particular operating system on the destination 109. The method in which segments are reassembled by a particular operating system can be exploited by the intruder 101. Note that although this illustration assumes an intruder 101 sending transmissions or segments, transmission or segments that are analyzed can be sent from anywhere.

The process of creating segments is discussed for example in connection with FIG. 2, and overlapping segments are generally discussed in connection with FIG. 3. A detailed discussion of types of overlapping segments is provided in connection with FIG. 4. Overlapping segments are handled differently by different kinds of hosts.

Figure 2:
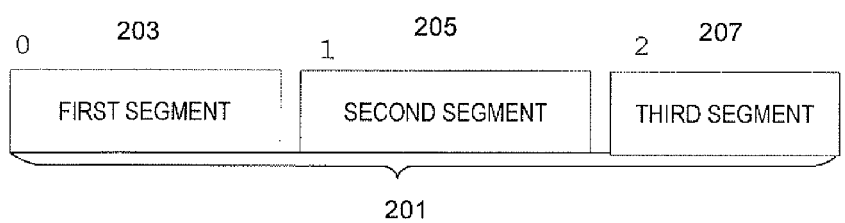
FIG. 2 is a diagram illustrating non-overlapping segments in transmission of a transmission control protocol (TCP) session.

Referring to FIG. 2, a diagram illustrating non-overlapping segments in a transmission of a TCP session will be discussed and described. Here, a transmission created at the TCP layer has been segmented into three segments 203, 205, 207. Each segment is provided with its own headers (IP (Internet protocol) and TCP) including information identifying the destination (conventionally in the IP header and in the TCP header) as well as the location of the segment's data in the original TCP transmission. The segments 203, 205, 207 belong to the same transmission, and can be reassembled to recreate the data in the original transmission.

In this illustration, the three segments 203, 205, 207 are received in sequence with no overlap; each segment includes one sequence number. Thus the first segment 203 has sequence number 0, the second segment has sequence number 1, and the third segment has sequence number 2. (Headers are omitted for clarity.) The reassembly of the segments is straightforward.

Figure 3:
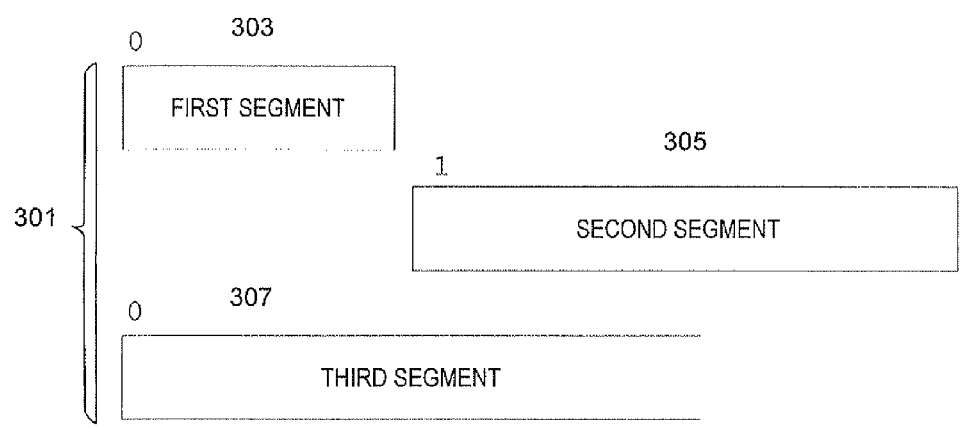
FIG. 3 is a diagram illustrating overlapping segments in the session.

Referring to FIG. 3, a diagram illustrating overlapping segments in a session will be discussed and described. FIG. 3 illustrates the same original transmission as in FIG. 2, which is divided into different segments 303, 305, 307. In this example, in contrast, the first segment 303 has sequence number 0, and the second segment encompasses sequence numbers 1 and 2. The third segment encompasses sequence numbers 0 and 1, and overlaps both the first and second segments. These segments are ostensibly in the same session.

One type of system, for example, a WINDOWS operating system, will include the first segment 303 and the second segment 305 in reassembly to re-create the transmission. Another type of system, for example, later versions of LINUX operating systems, will include the third segment 307 and sequence number 0 from the second segment 305 in a reassembly to re-create the transmission. Suppose that an intruder intends to evade the intrusion detection/prevention system by sending overlapping segments that differ in content. In order for an intrusion detection/prevention system to detect/prevent the attack, it should analyze the segments as they will be reassembled by the destination.

Although this is a simple illustration of overlapping segments, segment reassembly can be complicated by considerations such as the location of the overlap of the segments, discussed in connection with FIG. 4. Researchers Vern Paxson and Umesh Shankar conducted limited work on TCP stream reassembly ("Paxson/Shankar"), discussed in "Active Mapping: Resisting NIDS Evasion Without Altering Traffic," recognized several test cases, and concluded that four TCP reassembly policies exist. Testing of the Paxson/Shankar test cases reveals that Paxson/Shankar considered some, but not all, types of overlapped segments: (1) a segment that is wholly overlapped by a subsequent segment with an identical TCP sequence number and length ("completely overlapped"); (2) a segment that is partially overlapped by a subsequent segment with a TCP sequence number greater than the original ("partially overlapped", further defined below); and (3) a segment that is partially overlapped by a subsequent segment with a TCP sequence number less than the original ("partially overlapped," also further defined below). However, Paxson/Shankar did not consider all types of overlap, and as a result the Paxson/Shankar reassembly policies were incomplete.

Figure 4:
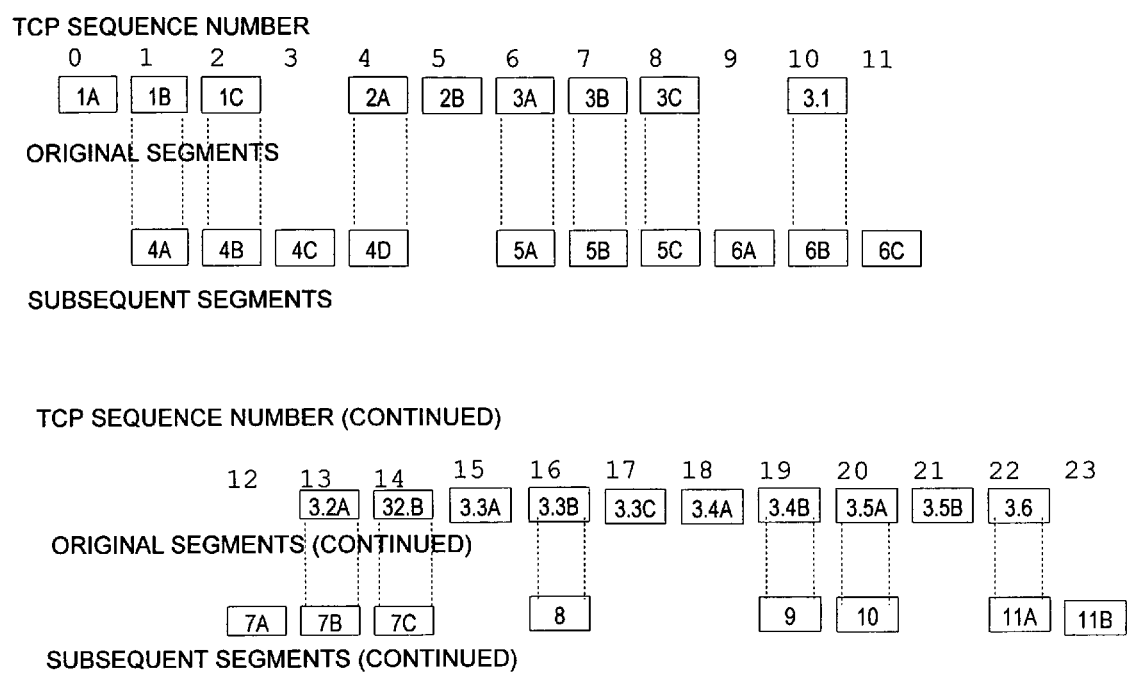
FIG. 4 is a diagram illustrating a model for analyzing overlapping segments.

The discussion of FIG. 4 addresses TCP segments and recognizes additional types of overlapping segments. In FIG. 4, the "original segments" are the segments that chronologically arrived first at the destination for a particular offset, and the "subsequent segments" are the segments that chronologically arrived after the original segment(s). The TCP sequence number indicates the sequence number of the segment.

Referring now to FIG. 4, a diagram illustrating a model for analyzing overlapping segments will be discussed and described. In FIG. 4, there are seventeen different segments, with each illustrated box representing a logical chunk of a segment; in this example, the chunk is one byte. Chunks 1A, 1B, 1C represent a first segment with three bytes of data; chunks 2A, 2B represent a second segment; chunks 3A, 3B, 3C represent a third segment, chunks 4A, 4B, 4C, 4D represent a fourth segment; chunks 5A, 5B, 4C represent a fifth segment; and chunks 6A, 6B, 6C represent a sixth segment. In addition, chunks 7A, 7B, 7C represent a seventh segment; chunk 8 represents an eighth segment; chunk 9 represents a ninth segment; chunk 10 represents a tenth segment; and chunks 11A, 11B represent an eleventh segment. Also, chunk 3.1 represents a 3.1 segment; chunks 3.2A, 3.2B represent a 3.2 segment; chunks 3.3A, 3.3B represent a 3.3 segment; chunks 3.4A, 3.4B represent a 3.4 segment; chunks 3.5A, 3.5B represent a 3.5 segment; and chunk 3.6 represents a 3.6 segment.

Each segment arrives at the TCP layer processing with a relative TCP sequence number, in accordance with known techniques. In this example, the first segment (1A-1C) has a beginning TCP sequence number from which the value of other sequence numbers is computed. The second segment (2A-2B) has a beginning TCP sequence number value four more than the sequence number value in the first segment; and so on. The destination uses the TCP sequence number value to reorder the segments during reassembly.

In FIG. 4, the fifth segment 5A, 5B, 5C completely overlaps the third segment 3A, 3B, 3C. They both start at the same TCP sequence number (6) and are the same length. Hence, the third and fifth segments illustrate an overlap of the type referred to herein as a "completely overlapping segment," or a complete overlap.

The fourth segment 4A, 4B, 4C, 4D partially overlaps the first segment 1A, 1B, 1C. The fourth segment starts at a sequence after the first segment and the length of the fourth segment is such that it ends after the first segment. Also, the fourth segment 4A, 4B, 4C, 4D partially overlaps the second segment 2A, 2B. The fourth segment starts before the second segment and ends before the second segment. The fourth and first segments and fourth and second segments illustrate overlaps of the type referred to herein as a "partially overlapping segment," or a "partial overlap."

The model illustrated in FIG. 4 also provides an illustration of various comprehensively overlapped segments. Examples of comprehensively overlapped segments in the model are shown in connection with original segment 3.1 (including chunk 3.1), original segment 3.2 (including chunks 3.2A, 3.2B), original segment 3.3 (including chunks 3.3A, 3.3B, 3.3C), original segment 3.4 (including chunks 3.4A, 3.4B), original segment 3.5 (including chunks 3.5A, 3.5B), original segment 3.6, subsequent segment 6 (including chunks 6A, 6B, 6C), subsequent segment 7 (including chunks 7A, 7B, 7C), subsequent segment 8, subsequent segment 9, subsequent segment 10, and subsequent segment 11 (including chunks 11A, 11B).

Segments which are referred to herein as "comprehensively overlapping segments" or "comprehensive overlap" include those where the sequence number (e.g., TCP sequence number) and length of the data of one of the overlapped segments is such that the data of one segment is comprehended (i.e., encompassed) by data of the other overlapped segment; however, "comprehensive overlap" does not include the case where the offset and length are identical.

The "comprehensively overlapped segments" include the following examples: the original segment starts before the subsequent segment and ends after the subsequent segment (e.g., segment 3.3 and segment 8); the original segment starts before the subsequent segment and ends the same as the subsequent segment (e.g., segment 3.4 and segment 9); the original segment starts the same as the subsequent segment and ends after the subsequent segment (e.g., segment 3.5 and segment 10); the original segment starts the same as the subsequent segment and ends before the subsequent segment (e.g., segment 3.6 and segment 11); the original segment starts after the subsequent segment and ends before the subsequent segment (e.g., segment 3.1 and segment 6); and the original segment starts after the subsequent segment and ends the same as the subsequent segment (e.g., segment 3.2 and segment 7).

Comprehensively overlapped segments also include the following examples: the subsequent segment starts before the original segment and ends after the original segment (e.g., segment 6 and segment 31); the subsequent segment starts before the original segment and ends the same as the original segment (e.g., segment 7 and segment 3.2); the subsequent segment starts the same as the original segment and ends after the original segment (e.g., segment 11 and segment 3.6); the subsequent segment starts the same as the original segment and ends before the original segment (e.g., segment 10 and segment 3.5); the subsequent segment starts after the original segment and ends before the original segment (e.g., segment 8 and segment 3.3); and the subsequent segment starts after the original segment and ends the same as the original segment (e.g., segment 9 and segment 3.4).

Another possible type of overlapping segment is referred to herein as a "non-overlapping segment," or a "non-overlap." In a non-overlapping segment, the sequence number and length of a segment are such that the segment does not have any overlap with any subsequent segment or original segment.

Accordingly, one or more embodiments provide that the segments can be one of non-overlapped, comprehensively overlapped, partially overlapped, and completely overlapped.

Utilizing the model of FIG. 4, at least seven different segment reassembly policies for example can be formulated: (1) WINDOWS (pre-VISTA)/BSD operating system favors an original segment except when the subsequent segment begins before the original segment; (2) WINDOWS VISTA operating system favors an original segment; (3) IRIX operating system favors an original segment except if the subsequent segment begins before or the same as the original segment and the subsequent segment ends the same or after the original segment; (4) LINUX operating system favors the original segment except when the subsequent segment begins before or the same as the original segment, and the subsequent segment ends after the original segment; (5) SOLARIS operating system favors the subsequent segment except when the original segment ends after the subsequent segment, or begins before the original segment and ends the same or after the original segment; (6) LINUX (old) operating system favors the subsequent segment except when the original segment begins before, or the original segment begins the same and ends after the subsequent segment; and (7) HPUX operating system favors the subsequent segment, except when the original segment begins before the subsequent segment. Accordingly, one or more embodiments provide an intrusion detection/prevention system with at least one of the segment reassembly policies.

Other reassembly policies can be formulated which take treat comprehensively overlapped segments in different ways. For example, a reassembly policy might call for ignoring comprehensively overlapping packets. As another example, a reassembly policy might call for honoring original or subsequent segments, depending on whether the original segment does or does not directly abut a previous original segment in sequence (left-anchored vs. non-left-anchored original segment); or whether the subsequent segment does or does not directly abut a previous subsequent segment in sequence (left-anchored vs. non-left anchored original segments). Segments 6 and 3.1 are an example of comprehensively overlapping segments with a non-left anchored original segment, because there is a gap of a sequence before segment 3.1. Segments 3.3 and 8 are an example of comprehensively overlapping segments with a left-anchored original segment, because there is no gap of any sequence before segment 3.3. Various embodiments can include a combination of any and/or all of the reassembly policies, where at least one of the policies has a different analysis for comprehensively overlapped segments. Optionally, a segment reassembly policy can include treatment specific to a segment (original or subsequent) which is left-anchored.

Accordingly, one or more embodiments provide that the segments can be one of non-overlapped, partially overlapped, comprehensively overlapped and completely overlapped; and the segment reassembly policy indicates an order specific to at least comprehensively overlapped segments. More particularly, the segment reassembly policy analyzes at least two segments (including an original segment and a subsequent segment) to determine whether they are comprehensively overlapped with respect to each other, and selects an order in which to reassemble the data in the at least two segments if it determines that they are comprehensively overlapped. Optionally, at least one of the at least two segments is further analyzed to determine whether they are left-anchored, and the segment reassembly policy selects an order in which to reassemble the data if it determines that at least one of the two segments is left-anchored.

A reassembly policy utilized by a particular type of destination can be observed, for example, by sending overlapping segments to a listening TCP port/application on a destination host and examining the response. For instance, sending a well formed HTTP (hyper text transfer protocol) request for a particular existing URL (uniform resource locator) on a web server should return the requested URL if overlapping TCP segments are reassembled in a particular manner. If they are reassembled in a different manner, the web server should return an error. The segment reassembly policy which is provided can be programmed to simulate the observed reassembly policy at a particular type of destination. A specific segment reassembly policy can be validated through active or passive scanners.

Figure 5:
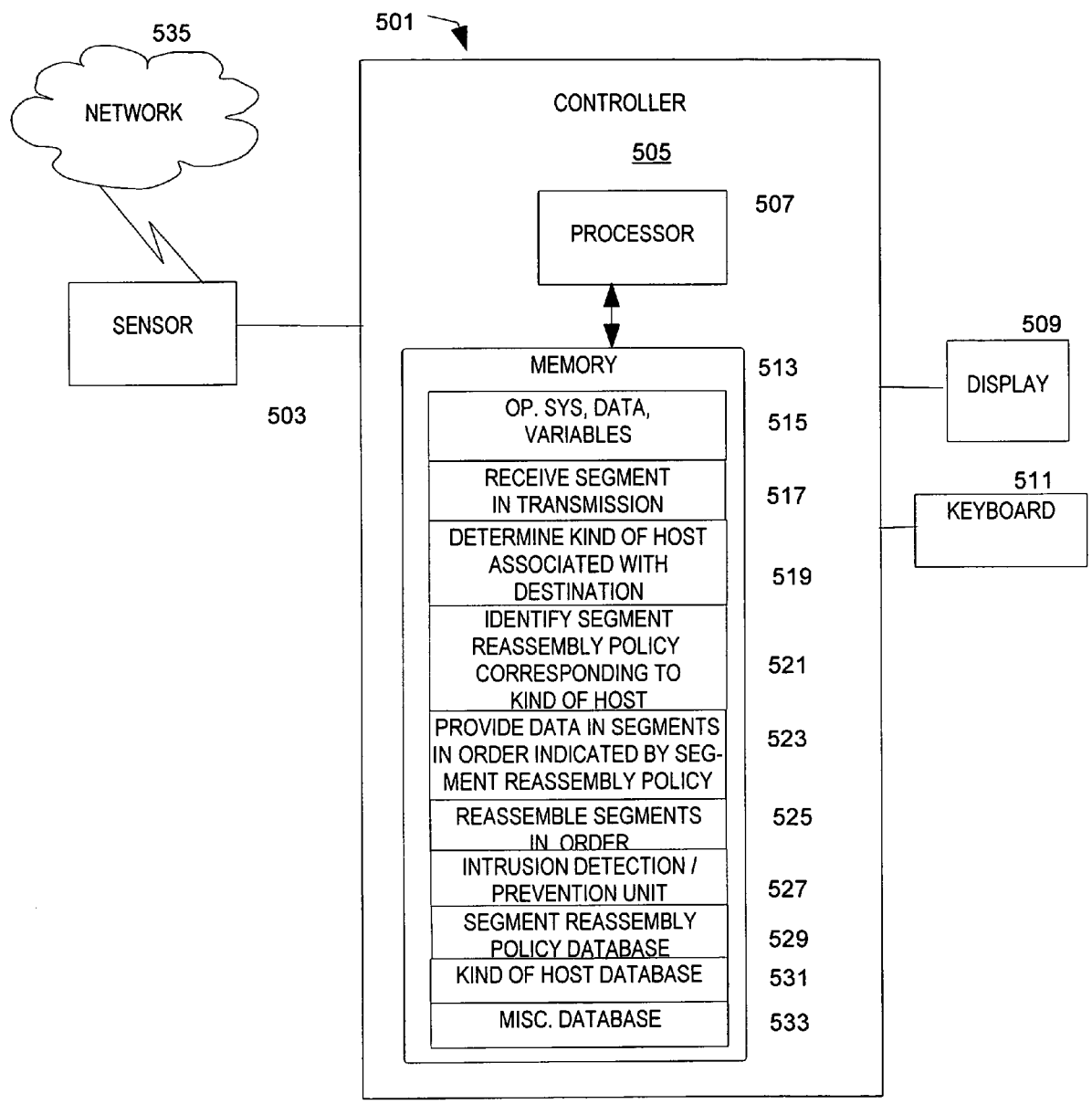
FIG. 5 is a block diagram illustrating portions of an exemplary computer system.

Referring to FIG. 5, a block diagram illustrating portions of an exemplary computer system 501 will be discussed and described. The computer system 501 may include one or more controllers 505, which can receive signals from a sensor 503 which senses communications from a network 535 in accordance with known techniques, where the communications are being sent to a destination (not illustrated). The controller 505 can include a processor 507, a memory 513, an optional display 509, and/or an optional user input device such as a keyboard 511.

The processor 507 may comprise one or more microprocessors and/or one or more digital signal processors. The memory 513 may be coupled to the processor 507 and may comprise a read-only memory (ROM), a random-access memory (RAM), a programmable ROM (PROM), and/or an electrically erasable read-only memory (EEPROM). The memory 513 may include multiple memory locations for storing, among other things, an operating system, data and variables 515 for programs executed by the processor 507; computer programs for causing the processor to operate in connection with various functions such as receiving 517 segments in a transmission, determining 519 a kind of host associated with the destination, identifying 521 the segment reassembly policy corresponding to the kind of host, providing 523 data in the segments in the order indicated by the segment reassembly policy, reassembling 525 the segments in the order, an intrusion detection/prevention unit 527, and/or other processing; a segment reassembly policy database 529; a kind of host database 531; and a database 533 for other information used by the processor 507. The computer programs may be stored, for example, in ROM or PROM and may direct the processor 507 in controlling the operation of the computer system 501.

The processor 507 optionally may be programmed for receiving 517 segments in a transmission. In the illustrated example, segments are detected by the sensor 503 connected to the computer system 501 and are supplied to the computer system 501 in accordance with known techniques. Accordingly, one or more embodiments include a receiving unit configured to facilitate receiving segments in the transmission, wherein the segments are received in accordance with a transport layer, or more particularly in accordance with a TCP layer.

The processor 507 may be programmed for determining 519 a kind of host associated with the destination. In the typical situation, the destination is identified in the segment, for example as a destination IP address found in the IP header. A kind of host database or table can be maintained for known destinations, which indicates the kind of host associated with a particular destination. The kind of host database or table can be created, for example by manual configuration or by querying certain destinations. Thus, the kind of host database or table can be referenced based on the destination identified in the segment to determine the associated kind of host. Alternatively, the segment can include an indication of the kind of host. The kind of host indicates an operating system/platform and optionally a version, for example, HP JetDirect, AIX 2, FreeBSD, HP-UX B10.20, IRIX 4.0, OpenBSD, OpenVMS, OS/2, OSF1, LINUX 2.x, MAC OS, WINDOWS, etc. The kind of host is intended to distinguish between platforms and/or operating systems that reassemble segments differently.

In addition, the processor 507 may be programmed for identifying 521 the segment reassembly policy corresponding to the kind of host. Having determined the kind of host, an appropriate segment reassembly policy can be determined. A particular segment reassembly policy can be applied in connection with one or more kinds of host. Advantageously, a table or database can indicate one of several segment reassembly policies to be applied for the particular kind of host. In the illustrated example, the segment reassembly policy database 529 includes two or more segment reassembly policies, which can be indexed, for example by the kind of host. The segment reassembly policies specify the order of reassembling segments according to transport layers of various kinds of hosts, or more particularly according to TCP layers of various kinds of hosts.

Once the segment reassembly policy is identified, the processor 507 can provide 523 data in the segments in the order indicated by the segment reassembly policy. Accordingly, one or more embodiments provides for determining the order of the data in the segments according to a TCP layer format. The data can be provided, for example, by parsing the received segments, by accumulating data from the segments in storage in the order, or by data from the segments being provided as input for another process (for example the intrusion detection/prevention unit 527). For example, the processor 507 can be programmed to handle the data in the segments according to one or more of the policies and orders discussed in connection with FIG. 4.

Accordingly, one or more embodiments provide a computer system for at least one of detecting and preventing intrusion. The computer system includes a unit configured to facilitate determining a kind of host associated with a destination, in response to an indication of the destination in segments in a transmission control protocol (TCP) session; a segment reassembly unit configured to facilitate identifying at least one segment reassembly policy of plural segment reassembly policies, the at least one segment reassembly policy corresponding to the kind of host associated with the segments in the transmission; and an order providing unit configured to facilitate providing data in the segments in the transmission in an order indicated by the at least one segment reassembly policy.

Optionally, the order providing unit can determine the order of the data in the segments according to a TCP layer format.

Optionally, the processor 507 may be programmed for specifically reassembling 525 the segments in the order. This can be done by storing the data from the segments, in the order, in a storage location, to recreate the transmission. The recreated transmission can be provided for further processing, for example, to the intrusion detection/prevention unit 527.

Accordingly, one or more embodiments includes a reassembler to reassemble the segments in the order indicated by the at least one segment reassembly policy. Also, one or more embodiments can include an intrusion detection/prevention unit to detect an intrusion in the reassembled segments, wherein the reassembler provides the reassembled segments to the intrusion detection/prevention unit.

The optional intrusion detection/prevention unit 527 in the processor 507 can be programmed in accordance with known techniques, to evaluate whether the segments (in the proper order) suggest an attempted intrusion. The intrusion detection/prevention unit 527 is illustrated as being incorporated into the computer system 501; alternate embodiments can provide that some or all of the intrusion detection/prevention functions are in one or more different computer systems. Further, alternate embodiments provide that the intrusion detection/prevention unit 527 is a host IDS (intrusion detection system) or host IPS (intrusion prevention system); thus the computer system can be the destination.

The processor 507 may be programmed for a segment reassembly policy database 529. The segment reassembly policy database 529 can include two or more segment reassembly policies. Alternatively, separate code can be provided for implementing the different segment reassembly policies. The segment reassembly policy database 529 alternatively can be stored in a remote database and accessed as needed.

The processor 507 may be programmed for a kind of host database 531. The kind of host database 531 can be maintained for known destinations, to indicate the kind of host associated with a particular destination. Optionally, the kind of host database 531 can be maintained remotely, and relevant kind of host information can be downloaded as needed. Optionally, the kind of host can be indicated in a table rather than a database. Accordingly, one or more embodiments provides that a plurality of destinations including the destination are provided, destinations being associated with respective kinds of hosts, respective kinds of hosts corresponding to respective segment reassembly policies; and the at least one segment reassembly policy which is identified or used corresponds to the kind of host associated with the destination.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database or collection of data and information. One or more embodiments can provide that the database or collection of data and information can be distributed, combined, or augmented, or provided locally (as illustrated) and/or remotely (not illustrated).

Figure 6:
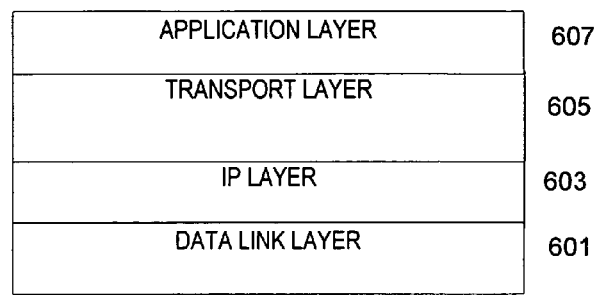
FIG. 6 is a block diagram illustrating transport layer processing.
Figure 7:
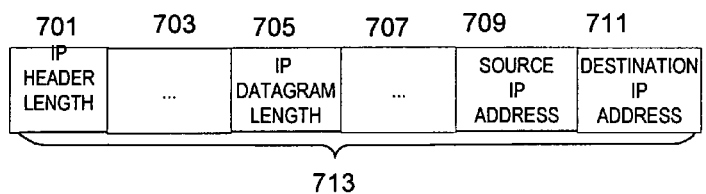
FIG. 7 is a block diagram illustrating portions of an Internet protocol (IP) header in a segment.
Figure 8:
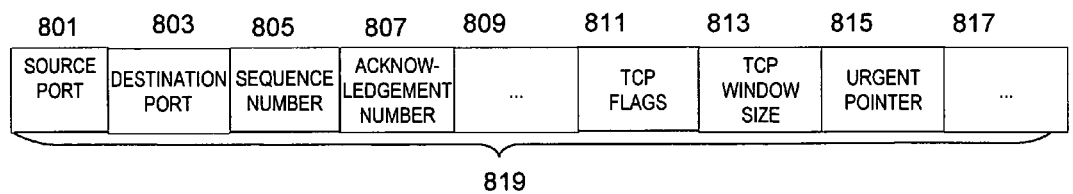
FIG. 8 is a block diagram illustrating portions of a TCP header in a segment.

FIG. 6, FIG. 7 and FIG. 8 illustrate relevant conventions associated with TCP layer processing. FIG. 6 illustrates transport layer processing (also known as "TCP layer" processing); FIG. 7 illustrates relevant portions of an Internet protocol (IP) header transporting a segment; and FIG. 8 illustrates relevant portions of a TCP header of a segment.

Referring to FIG. 6, a block diagram illustrating transport layer processing will be discussed and described. This example illustrates a data link layer 601, an IP layer 603, a transport layer 605, and an application layer 607. A packet is received and processed in accordance with known means at the various layers. For example, an incoming packet is initially received at the data link layer 601; passed to the IP layer 603; passed to the transport layer 605; and then sequentially passed to layers above for additional processing.

Conventions associated with the data link layer 601, the IP layer 603, the transport layer 605 and the application layer 607, and the like are well known. In particular, conventions for formats and protocols of transmissions and of segments in accordance with the transport layer are well known. The segments can be monitored and/or received in accordance with the transport layer protocol, that is, the segments are interpreted in accordance with the transport layer protocol and its formats; more particularly, the transport layer protocol can be a TCP layer protocol.

Accordingly, one or more embodiments provide that the monitoring is performed in accordance with a TCP layer.

Referring to FIG. 7, a block diagram illustrating portions of an IP header 713 in a segment will be discussed and described. The illustrated IP header 713 is a portion of a transmission formatted according to the IP layer, which also includes data. The IP header 713 includes an IP header length 701, an IP datagram length 705, an indication of the source IP address 709, and an indication of the destination IP address 711. Other fields 703, 707 typically are included in the IP header 713.

The IP datagram length 705 indicate the length of the content of the IP packet. The destination IP address 711 uniquely identifies the system for which the transmission is destined. The source IP address 709 uniquely identifies the system which originated the transmission.

Referring now to FIG. 8, a block diagram illustrating portions of a TCP header 817 in a segment will be discussed and described. Portions of the conventional TCP header 817 which can be referenced include a source port 801, a destination port 803, a TCP sequence number 805, an acknowledgement number 807, TCP flags 811, TCP window size 813, urgent pointer 815, and miscellaneous other fields 809, 817.

in this example, the IP packet including the IP header 713 is wrapped around the TCP packet at the IP layer processing before being transmitted. Hence, a transmission which is monitored will include both the IP header 713 and the TCP header (illustrated in FIG. 8).

The sequence number 805 and TCP flags 811 are known fields used to reassemble a transmission. The TCP flags can indicate, among other things, whether the segment is to be treated as "urgent." Data in a segment which has an urgent indication is reassembled differently by different operating systems, as discussed in more detail below.

Accordingly, there is provided a method having plural segment reassembly policies including the segment reassembly policy, wherein the segment reassembly policy corresponds to a destination associated with the segments in the transmission. Moreover, one or more embodiments provide that the destination is indicated as a destination address and destination port in the segments. Also, according to one or more embodiments, the segments are formatted according to a TCP layer format. Furthermore, according to one or more embodiments, the segments in a session are received, wherein the receiving is performed in accordance with a TCP layer, and the data in the segments is provided, including applying the TCP layer format to the segments.

Figure 9:
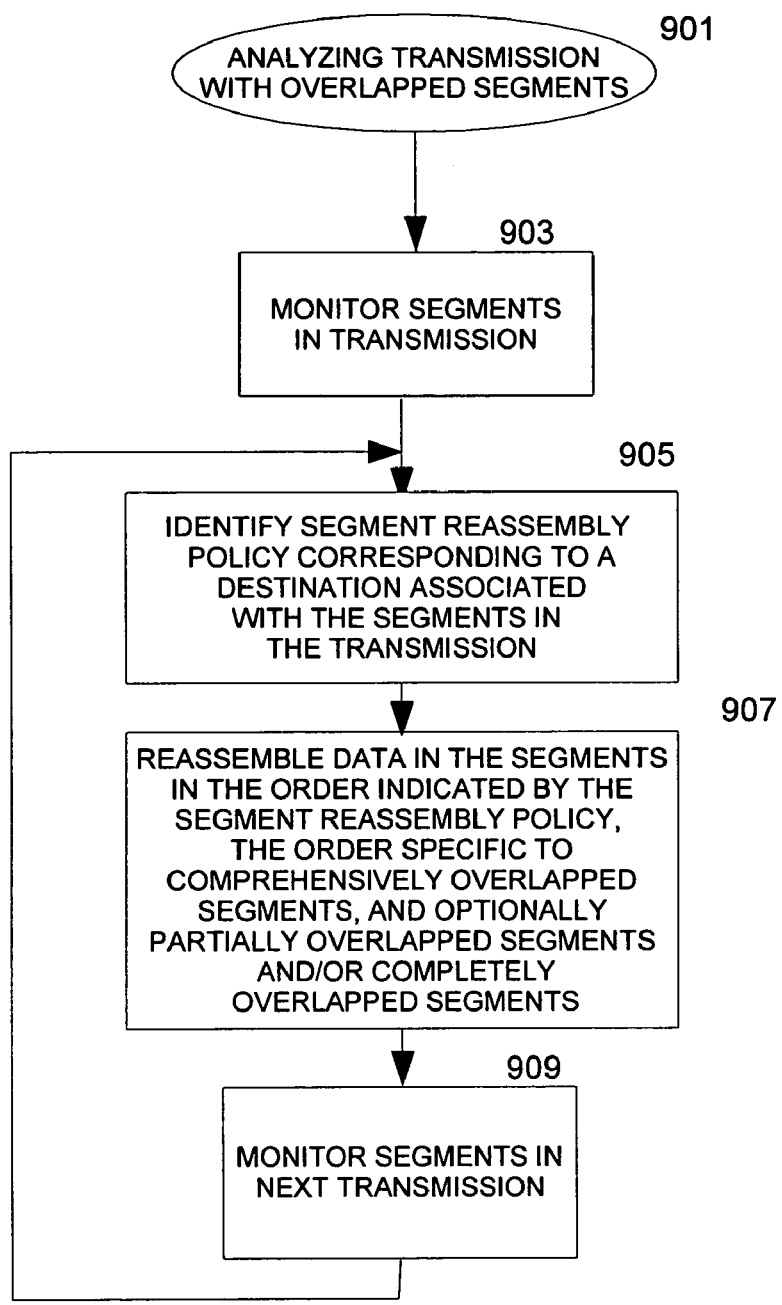
FIG. 9 is a flow chart illustrating an exemplary procedure for analyzing a transmission with overlapped segments.
Figure 10:
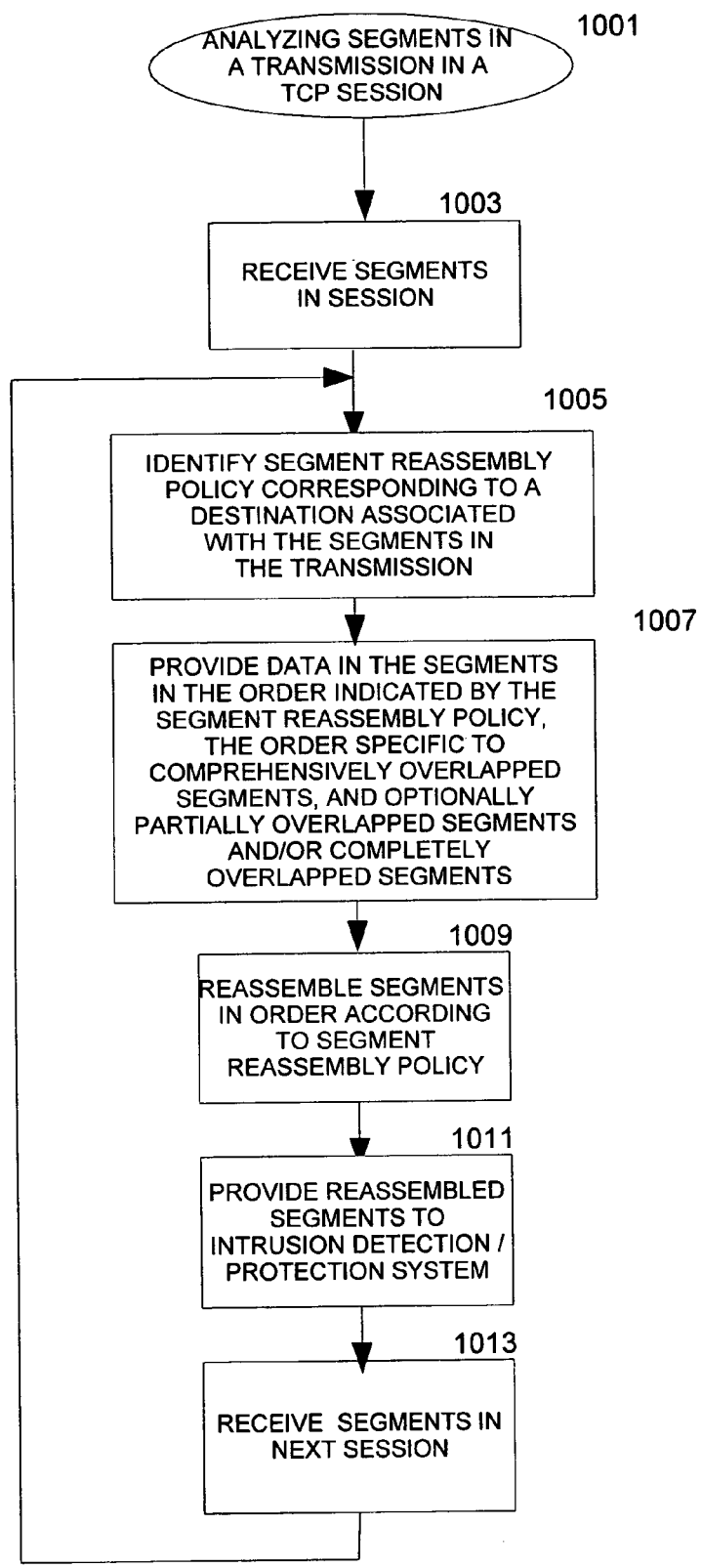
FIG. 10 is a flow chart illustrating an exemplary procedure for analyzing segments in a transmission in a TCP session.
Figure 11:
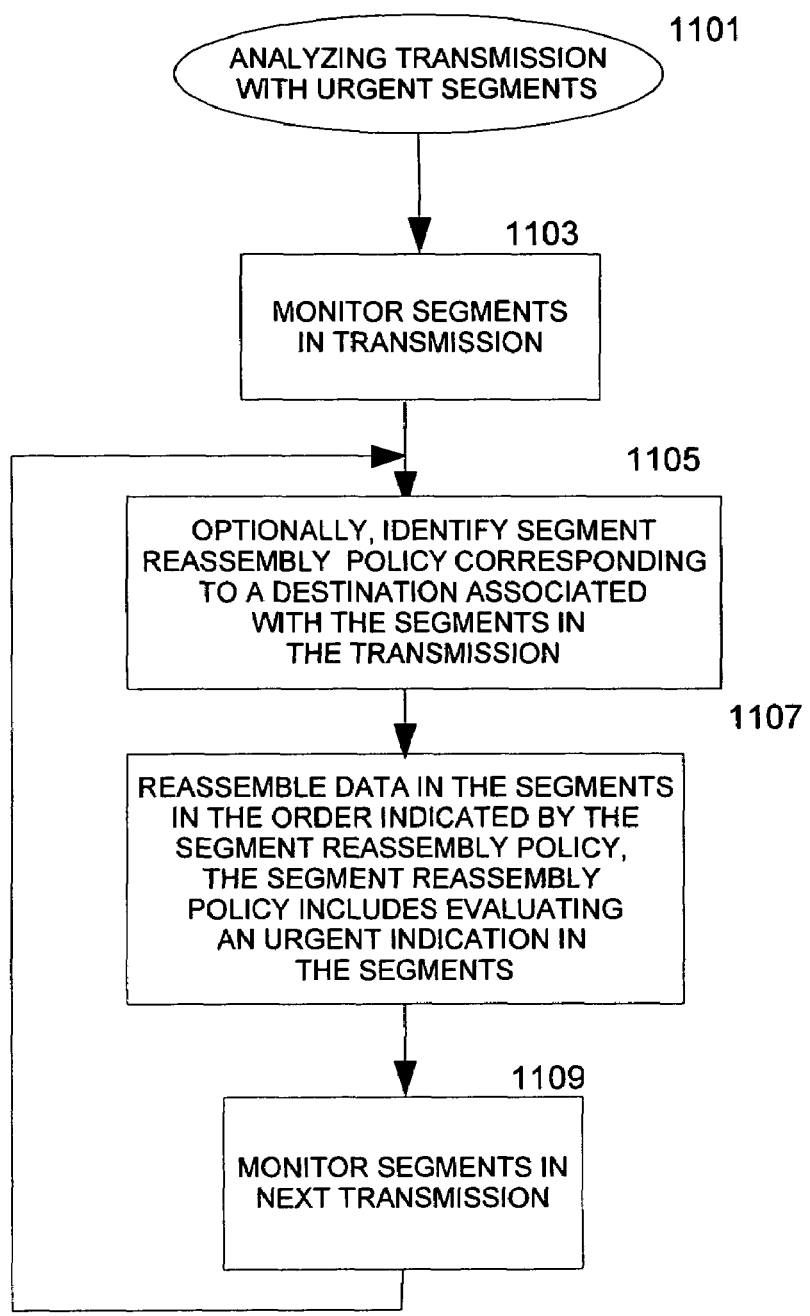
FIG. 11 is a flow chart illustrating an exemplary procedure for analyzing a transmission including an evaluation of an urgent indication in the segments.

FIG. 9, FIG. 10 and FIG. 11 are flow charts of procedures for analyzing segments. FIG. 9 illustrates a procedure for analyzing overlapped segments in a transmission, FIG. 10 provides an example of analyzing segments in a transmission in a TCP session, and FIG. 11 is an illustration of analyzing segments for an urgent indication. These procedures can advantageously be implemented on, for example, a processor of a controller, described in connection with FIG. 5 or other apparatus appropriately arranged. Although these are illustrated as separate procedures, it will be appreciated that a procedure can handle both the "urgent" indication and the overlapped segments. FIGS. 9, 10 and 11 are discussed in more detail below.

Referring to FIG. 9, a flow chart illustrating an exemplary procedure 901 for analyzing a transmission with overlapped segments will be discussed and described. In overview, the procedure 901 includes monitoring 903 segments in a transmission, identifying 905 a segment reassembly policy corresponding to a destination associated with the segment, reassembling data 907 in the segments in the order according to the segment reassembly policy specific to at least comprehensively overlapped segments, and monitoring 909 segments in the next transmission. These are described below, however, details which have previously been described are omitted.

The procedure includes monitoring 903 segments in a transmission. The segments can be monitored in accordance with known techniques. Multiple segments optionally can be stored while being monitored, according to conventional technology. Because segments are not necessarily received in sequential order, it will be appreciated that the monitoring of segments and the process for providing the data in the segments and/or reassembling the segments can be handled asynchronously.

When a transmission is monitored, the procedure provides for identifying 905 a segment reassembly policy corresponding to a destination associated with the segment. For example, the destination can be determined from the IP header; the kind of host associated with the destination can be determined (as described above); and the segment reassembly policy for the kind of host can be determined (as described above).

Then, the procedure can include providing the data 907 in the segments in the transmission in the order according to the segment reassembly policy, where the order is specific to comprehensively overlapped segments and optionally to partially overlapped segments and/or completely overlapped segments. This has been described above in detail.

Having handled a transmission, the procedure can provide for monitoring 909 segments in the next transmission.

Accordingly, one or more embodiments provides for a method performed in an intrusion detection/prevention system, for analyzing segments in a transmission in a communication network, the transmission including a plurality of segments in the same transmission control protocol (TCP) session. The method includes monitoring a plurality of segments in a transmission; and reassembling data in the segments in the transmission in an order indicated by a segment reassembly policy, the segment reassembly policy indicating an order specific to at least comprehensively overlapped segments.

Referring to FIG. 10, a flow chart illustrating an exemplary procedure 1001 for analyzing segments in a transmission in a TCP session will be discussed and described. In overview, the procedure 1001 includes receiving 1003 segments in a session, identifying 1005 a segment reassembly policy corresponding to a destination associated with the segments in the transmission, providing data 1007 in the segments in the order according to the segment reassembly policy including handling comprehensively overlapped segments, and receiving 1011 segments in the next session. Optionally, the procedure 1001 can include reassembling 1009 the segments in the order and providing 1011 the reassembled segments to an intrusion detection/prevention system. Details which have previously been described are omitted. Furthermore, much of FIG. 10 is similar to FIG. 9; to avoid repetition, reference is made back to FIG. 9 where appropriate.

The procedure includes receiving 1003 segments in a session. Known techniques can be used for receiving the segments. When a segment is received, the procedure provides for identifying 1005 a segment reassembly policy corresponding to a destination associated with the segment in the transmission, as described in FIG. 10.

Then, the procedure can include providing the data 1007 in the segments of the session in the in the order according to the segment reassembly policy, where the order is specific to at least comprehensively overlapped segments. Optionally, the order can handle partially overlapped segments and/or completely overlapped segments. This has been described above in detail.

Optionally, the procedure 1001 can include reassembling 1009 the segments in the order according to the segment reassembly policy, and/or providing 1011 the reassembled segments to an intrusion detection/prevention system. Each of these is described above in detail. Having handled segments in a transmission, the procedure can provide for receiving 1013 segments in the next session.

Accordingly, one or more embodiments can provide a computer-readable medium comprising instructions for execution by a computer, the instructions including a computer-implemented method for analyzing segments in a transmission in a communication network, a transmission including a plurality of segments in the same transmission control protocol (TCP) session and associated with the same destination, where segments can be one of non-overlapped, partially overlapped, and completely overlapped. The instructions can implement identifying at least one segment reassembly policy of plural segment reassembly policies, the at least one segment reassembly policy corresponding to a destination associated with segments in a transmission; and providing data in the segments in the transmission in an order indicated by the at least one segment reassembly policy, the at least one segment reassembly policy indicating an order specific to at least comprehensively overlapped segments. Optionally, there can be provided instructions for reassembling the segments in the order indicated by the at least one segment reassembly policy; and providing the reassembled segments to an intrusion detection/protection system.

Referring now to FIG. 11, a flow chart illustrating an exemplary procedure 1101 for analyzing a transmission including an evaluation of an urgent indication in the segments will be discussed and described. First, a discussion of the complications presented by the use of the "urgent" indication is provided.

The TCP urgent indication (conventionally comprising the urgent flag) together with the urgent pointer (conventionally indicating an end of the urgent data) is a little-used technique for TCP to handle application level "urgent" data. A classic example of urgent data occurs when a transfer of a large volume of data needs to be interrupted "out-of-bad" mid-transfer. In this example, some kind of data would be sent in another TCP segment with an "urgent" indication, and the TCP layer would treat the "urgent" data immediately due to the "urgent" indication.

Different operating systems treat data differently where the data has an urgent indication. They may either include the urgent data in the reassembly, or they may drop the data and not include it in the reassembly.

Besides the different handling depending on the "urgent" indication, different operating systems can treat urgent data distinctively depending on the value of the urgent pointer. To add to the confusion, an initial RFC (Request for Comments) misstated how to compute the location of the last byte of urgent data. Some operating systems ignore (that is, reassemble normally) urgent data where the urgent pointer has a value of zero. On the other hand, LINUX operating systems for example treat urgent data the same, even if the urgent pointer has a value of zero. As another example, some versions of WINDOWS operating systems ignore urgent data when the value of the urgent pointer is greater than two, while other operating systems treat this type of urgent data as they would other urgent data. Finally, an urgent pointer value that is greater than the length of data in the current segment ostensibly points to a future segment. Most operating systems, except for example for LINUX operating systems, ignore the urgent data and consider the data in normal reassembly The following table indicates, by way of example, how segment reassembly policies can evaluate an urgent indication in the segments. This table is not intended to be comprehensive, and therefore reassembly policies are not limited to the examples provided herein.

TABLE 1

| Operating system | TCP Urg ptr = 0 | TCP Urg ptr = 1 | TCP Urg ptr > 2 | TCP Urg ptr ->+ packet |
|---|---|---|---|---|
| WIN2000 SP4 | Ignores | Drops | Ignores* | Ignores |
| WINXP | Ignores | Drops | Drops | Ignores |
| WIN 2003 | Ignores | Drops | Drops | Ignores |
| FREEBSD 4.x | Ignores | Drops | Drops | Ignores |
| FREEBSD 5.x | Ignores | Drops | Drops | Ignores |
| MAC OS X 10.3 | Ignores | Drops | Drops | Ignores |
| OPENBSD 3.6 | Ignores | Drops | Drops | Ignores |
| LINUX 2.2 | Drops | Drops | Drops | Drops |
| LINUX 2.4 | Drops | Drops | Drops | Drops |
| SOLARIS 10 | Ignores | Drops | Drops | Ignores |

Ignores*: WINDOWS ME, WINDOWS 2000 SP0, SP3 drop bytes in the current packet; WINDOWS 2000 SP4 treatment is not confirmed.

In FIG. 11, the example procedure 1101 for analyzing transmission with urgent segments includes, in overview, monitoring 1103 segments in a transmission, identifying 1105 a segment reassembly policy corresponding to a destination associated with the segment, reassembling data 1107 in the segments in the order according to the segment reassembly policy where the segment reassembly policy includes evaluating an urgent indication in the segments, and monitoring 1109 segments in the next transmission. Much of FIG. 11 is numbered analogous to FIG. 9, and much of the discussion is omitted because details have been provided above, for example in connection with FIG. 9.

The procedure includes monitoring 1103 segments in a transmission. The segments can be monitored in accordance with known techniques, as described above.

Optionally, the procedure can identify 1105 a segment reassembly policy corresponding to a destination associated with the segment, as described above.

Then, the procedure can include reassembling the data 1107 in the segments in the transmission in the order according to the segment reassembly policy, where the segment reassembly policy includes evaluating an "urgent" indication in the segments.

Having handled a transmission, the procedure can provide for monitoring 1109 segments in the next transmission.

Accordingly, one or more embodiments provide that the segment reassembly policy includes evaluating an urgent indication in the segments.

In addition, one or more embodiments provide a method performed in an intrusion detection/prevention system, for analyzing segments in a transmission in a communication network, the transmission including a plurality of segments in the same transmission control protocol (TCP) session. The method can include (A) monitoring a plurality of segments in a transmission; and (B) reassembling data in the segments in the transmission in an order indicated by a segment reassembly policy, the segment reassembly policy including an evaluation of an urgent indication in the segments.

Moreover, embodiments include a computer system configured with the foregoing computer-readable medium and/or method(s); and/or a communication network comprising at least one computer system configured with the foregoing computer-readable medium and/or method(s).

It should be noted that the communication networks of interest include those that transmit information in packets which can be formed into segments, for example, those known as packet switching networks that transmit data, where data can be divided into packets before transmission, the packets are transmitted, and the packets are routed over network infrastructure devices, which are sent to a destination where the segments of packets can be reassembled into the packets. Such networks include, by way of example, the Internet, intranets, local area networks (LAN), wireless LANs (WLAN), wide area networks (WAN), and others. Protocols supporting communication networks that utilize packets include one or more of various networking protocols having any link layers that support the TCP transport layer, or any application that rides over the transport layer, and other wireless application protocols or wireline application protocols and/or other protocol structures, and variants and evolutions thereof. Such networks can provide wireless communications capability and/or utilize wireline connections such as cable and/or a connector, or similar.

Furthermore, the designation "intrusion detection/prevention system" is used herein to denote a device or software that passively or actively analyzes network traffic for intrusion. Examples of such devices or software are sometimes referred to as "intrusion detection system" (IDS), "intrusion prevention system" (IPS), "network intrusion detection system" (NIDS), "network intrusion protection system" (NIPS"), and the like, and variants or evolutions thereof. An intrusion detection/prevention system may be host-based, or may monitor traffic to a target system using, for example, sensors, anywhere between the target system and the intruder, typically after a final router or firewall. The designation "intrusion detection/prevention" is used herein to indicate the analysis of network traffic with respect to intrusion, whether the analysis is used passively (commonly referred to as "intrusion detection") or actively (commonly referred to as "intrusion prevention"). Likewise, the designation "detect/prevent" is utilized to indicate either passive or active handling of intrusion, which may occur for example in an IDS, an IPS, or other software or device which incorporates an IDS or IPS function.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method performed in a processor of an intrusion detection/prevention system, for analyzing segments in a transmission in a communication network, the transmission including a plurality of segments in the same transmission control protocol (TCP) session, comprising:

(A) monitoring, in a processor of an intrusion detection/prevention system, a plurality of segments in a transmission and determining a kind of host of a destination of the segments in response to receiving the segments; and (B) reassembling, in the processor, data in the segments in the transmission in an order indicated by a segment reassembly policy selected from plural different processor-resident segment reassembly policies corresponding to different kinds of hosts based on the determined kind of host of the destination of the segments, the segment reassembly policy indicating an order specific to comprehensively overlapped segments, when the data is in the comprehensively overlapped segments, the order of the data indicated by the segment reassembly policy is different from the order of the data when in segments which are not comprehensively overlapped, the data in comprehensively overlapped segments further being reassembled in a different order in the different segment reassembly policies.

2. The method according to claim 1, wherein a plurality of destinations including the destination are provided, the destination being associated with the kind of host, respective kinds of host being associated with respective segment reassembly policies, and the segment reassembly policy is associated with the kind of host associated with the destination.

3. The method according to claim 1, wherein the segment reassembly policy includes evaluating an urgent indication in a transmission control protocol (TCP) flags field of a TCP header in the segments, and when the data in the segments has the TCP flags field including the urgent indication, the order of the data indicated by the segment reassembly policy is different from the order of the data when in segments which do not have the urgent indication in the TCP flags field, the order of the data in segments with the urgent indication in the TCP flags field further being different for the different segment reassembly policies.

4. The method according to claim 1, wherein the monitoring is performed in accordance with a TCP layer.

5. The method according to claim 1, wherein the segments are formatted according to a TCP layer format.

6. The method according to claim 1, wherein the segments can be one of non-overlapped, comprehensively overlapped, partially overlapped, and completely overlapped.

7. The method according to claim 3, the order of the reassembled data further being reassembled differently depending on the TCP flags field in combination with a value in a TCP header pointer field in a same segment, the order of the data in segments with the urgent indication in the TCP flags field further being reassembled differently in the different segment reassembly policies.

8. A computer-readable non-transitory medium comprising instructions for execution by a computer, the instructions including a computer-implemented method for analyzing segments in a transmission in a communication network, a transmission including a plurality of segments in the same transmission control protocol (TCP) session and associated with the same destination, where segments can be one of non-overlapped, partially overlapped, and completely overlapped, the instructions for implementing:

(A) determining a kind of host of a destination of segments in a transmission in response to receiving the segments, and identifying at least one segment reassembly policy of plural different processor-resident segment reassembly policies corresponding to different kinds of hosts, the at least one segment reassembly policy corresponding to the determined kind of host of the destination; and (B) providing data in the segments in the transmission in an order indicated by the at least one segment reassembly policy, the at least one segment reassembly policy indicating an order specific to comprehensively overlapped segments, when the data is in the comprehensively overlapped segments, the order of the data indicated by the segment reassembly policy is different from the order of the data when in segments which are not comprehensively overlapped, the data in comprehensively overlapped segments further being reassembled in a different order in the different segment reassembly policies.

9. The computer-readable medium according to claim 8, further comprising instructions for:

reassembling the segments in the order indicated by the at least one segment reassembly policy; and providing the reassembled segments to an intrusion detection/protection system.

10. The computer-readable medium according to claim 8, further comprising instructions for receiving the segments in the session, wherein the receiving is performed in accordance with a TCP layer, and the providing data in the segments includes applying the TCP layer format to the segments.

11. The computer-readable medium according to claim 8, wherein a plurality of destinations including the destination are provided, a destination being associated with a kind of host, respective kinds of host being associated with respective segment reassembly policies, and the at least one segment reassembly policy which is identified is associated with the kind of host associated with the destination.

12. The computer-readable medium according to claim 8, wherein the at least one segment reassembly policy includes evaluating an urgent indication in a transmission control protocol (TCP) flags field of a TCP header in the segments, and when the data in the segments has the TCP flags field including the urgent indication, the order of the data indicated by the segment reassembly policy is different from the order of the data when in segments which do not have the urgent indication in the TCP flags field, the order of the data in segments with the urgent indication in the TCP flags field further being different from the different segment reassembly policies.

13. A computer system configured with the computer-readable medium of claim 8.

14. A communication network comprising at least one computer system configured with the computer-readable medium of claim 8.

15. A computer system for at least one of detecting and preventing intrusion, comprising:

(A) a unit configured by a computer to facilitate determining a kind of host of a destination of segments in a transmission, in response to receiving the segments in a transmission control protocol (TCP) session;

(B) a segment reassembly unit configured to facilitate selecting at least one segment reassembly policy of plural different processor-resident segment reassembly policies corresponding to different kinds of hosts, the at least one segment reassembly policy corresponding to the kind of host associated with the segments in the transmission; and (C) an order providing unit configured to facilitate providing data in the segments in the transmission in an order indicated by the at least one segment reassembly policy, the segment reassembly policy indicating an order specific to comprehensively overlapped segments, when the data is in the comprehensively overlapped segments, the order of the data indicated by the segment reassembly policy is different from the order of the data when in segments which are not comprehensively overlapped, the data in comprehensively overlapped segments further being reassembled in a different order in the different segment reassembly policies.

16. The computer system according to claim 15, further comprising a reassembler to reassemble the segments in the order indicated by the at least one segment reassembly policy.

17. The computer system according to claim 16, further comprising an intrusion detection/prevention unit to detect an intrusion in the reassembled segments, wherein the reassembler provides the reassembled segments to the intrusion detection/prevention unit.

18. The computer system according to claim 15, further comprising a receiving unit configured to facilitate receiving segments in the transmission, wherein the segments are received in accordance with a TCP layer.

19. The computer system according to claim 15, wherein the order providing unit further determines the order of the data in the segments according to a TCP layer format.

20. The computer system according to claim 15, wherein the destination is indicated as a destination address and destination port in the segments.

21. The computer system according to claim 15, wherein
a plurality of destinations including the destination are provided, a destination being associated with a kind of host, respective kinds of host corresponding to respective segment reassembly policies, and
the at least one segment reassembly policy which is identified corresponds to the kind of host associated with the destination.

22. The computer system according to claim 15, wherein
the segments can be one of non-overlapped, partially overlapped, comprehensively overlapped, and completely overlapped,
and the segment reassembly policy indicates an order specific to at least comprehensively overlapped segments.

23. A computer system for at least one of detecting and preventing intrusion, comprising:
(A) a unit configured by a computer to facilitate determining a kind of host of a destination of segments in a transmission, in response to receiving the segments in a transmission control protocol (TCP) session;
(B) a segment reassembly unit configured to facilitate selecting at least one segment reassembly policy of plural different processor-resident segment reassembly policies corresponding to different kinds of hosts, the at least one segment reassembly policy corresponding to the kind of host associated with the segments in the transmission; and
(C) an order providing unit configured to facilitate providing data in the segments in the transmission in an order indicated by the at least one segment reassembly policy,
wherein the segment reassembly policy includes evaluating an urgent indication in a transmission control protocol (TCP) flags field of a TCP header in the segments, and
when the data in the segments has the TCP flags field including the urgent indication, the order of the data indicated by the segment reassembly policy is different from the order of the data when in segments which do not have the urgent indication in the TCP flags field,
the order of the data in segments with the urgent indication in the TCP flags field further being different from the different segment reassembly policies.

24. A method performed in a processor of an intrusion detection/prevention system, for analyzing segments in a transmission in a communication network, the transmission including a plurality of segments in the same transmission control protocol (TCP) session, comprising:
(A) monitoring, in a processor of an intrusion detection/prevention system, a plurality of segments in a transmission; and
(B) reassembling, in the processor, data in the segments in the transmission in an order indicated by a segment reassembly policy, the segment reassembly policy including an evaluation of an urgent indication in a TCP flags field of a TCP header in the segments, and
when the data in the segments has the TCP flags field including the urgent indication, the order of the data indicated by the segment reassembly policy is different from the order of the data when in segments which do not have the urgent indication in the TCP flags field,
the order of the data in segments with the urgent indication in the TCP flags field further being different from the different segment reassembly policies.

* * * * *